May 16, 1939.   V. H. MEYER   2,158,192
CLUTCH MECHANISM
Filed Oct. 1, 1936

INVENTOR
Vernon H. Meyer
By his Attorney
Harlow M. Davis

Patented May 16, 1939

2,158,192

UNITED STATES PATENT OFFICE 2,158,192

CLUTCH MECHANISM

Vernon H. Meyer, Beverly, Mass., assignor to United Shoe Machinery Corporation, Paterson, N. J., a corporation of New Jersey Application October 1, 1936, Serial No. 103,548

8 Claims. (Cl. 192—27)

This invention relates to roller clutches and is herein illustrated as embodied in a roller clutch similar to the well-known "Horton" type clutch.

In small clutches of this type from four to six rollers are usually used and a somewhat greater number in larger ones. Such clutches must be manufactured with extreme accuracy in order to have each roller bear its proportionate share of the load. Otherwise one or two rollers may take a large proportion of the load, causing excessive wear and possible cramping of the driving pulley on the shaft. This difficulty is accentuated if the driving pulley becomes worn and eccentric to the shaft.

It is an object of the present invention to provide a roller clutch for engaging and disengaging a driven member from a driving member in which no one roller, or any part associated therewith, can take any more load than any of the other corresponding ones, even under extreme conditions, and which will thus prevent the difficulties mentioned.

With the above and other objects in view, the two embodiments of my invention, illustrated herein, are provided with only three rollers equally spaced angularly around the circumference of the driving member, and with three intermediate members. In one embodiment, the intermediate members are illustrated as rollers, preferably larger than the first-mentioned rollers. In the other embodiment, the intermediate members are illustrated as rectangular blocks although blocks of other shapes may be used. In both embodiments, each of the intermediate members may be contacted with one of the first-mentioned rollers to receive the wedging pressure therefrom by which the clutch is engaged. A floating member is provided which is spaced from the shaft and is substantially coaxial therewith. This floating member receives the pressure of each intermediate member, which pressure is resisted and balanced by the pressure from the other two opposing intermediate members. Thus it is impossible for one intermediate member and its cooperating roller to exert any more pressure than either of the others because the floating member is free to move transversely of the shaft sufficiently (as it is out of contact with the shaft) until all pressures are equal. The contacts made by the floating member with the intermediate members should obviously be spaced substantially 120° apart around the periphery of the floating member. The alternate sides of a hexagonal prism are so spaced and such a prism is well suited to serve as a floating member for this reason and for other reasons to be explained.

When the clutch is being engaged, the small rollers are rotated slightly by the driving member of the clutch and come into driving contact with the intermediate members to cause the floating member to be rotated with respect to the shaft sufficiently to lock the parts to each other and to the floating member.

Because the floating member is not connected to the shaft, it cannot be used to drive the shaft and the means provided for this purpose consists of a cage in which the intermediate members are located and are freely movable radially. When the parts are locked, the cage is driven by the locked parts so that this cage thus serves as the driven member of the clutch and it is connected to the shaft of the machine to be driven.

After a time, when rollers are used as intermediate members, wear may cause grooves to be formed on the floating member, and it is another object of the present invention to provide an improved clutch in which, after such grooves have been formed so as to interfere with the operation of the clutch, the entire clutch may be disassembled and reassembled with the parts in a different but equivalent relation to each other and, further, to provide one in which this operation of reassembling may be repeated more than twice or until the clutch has been assembled with the floating member in all possible positions relative to the intermediate members.

With this object in view, in the illustrated form of clutch having rollers as intermediate members, a floating member is provided having roller engaging surfaces constituting the sides of a regular prism, upon which surfaces the rollers may form the above-mentioned grooves after considerable use. This member can best be made hexagonal with only the surfaces of the alternate sides of the prism engaged by the intermediate rollers in any one assembly of the apparatus, these alternate sides corresponding with the spacing of such rollers. When the grooves have become so deep that it is necessary to obtain new wearing surfaces against which the rollers can bear, the prism is reversed relatively to the shaft, end to end, to provide a new surface on the opposite side of the center of the surface from the previously formed groove. Two other wearing surfaces are obtained by assembling the prism on the shaft with the heretofore unused alternate faces of the prism in operative relation to the rollers, thus making four possible different assemblies with such a hexagonal prism.

In the just-mentioned illustrated construction the rollers that provide the wedging action between the surface of the driving member and the intermediate rollers are relatively small, to secure a suitable grip between the two, and the intermediate rollers are relatively large to distribute the load on the floating member and reduce the tendency to form grooves therein.

The parts in both illustrated constructions are of simple shape and are easy and inexpensive to manufacture. Furthermore, owing to the self-equalizing feature of the construction, the extreme accuracy in manufacturing is not as necessary as in prior constructions.

Other objects and features of the invention will be best understood and appreciated from an inspection of the accompanying drawing, when considered in connection with the following description.

Figure 1:
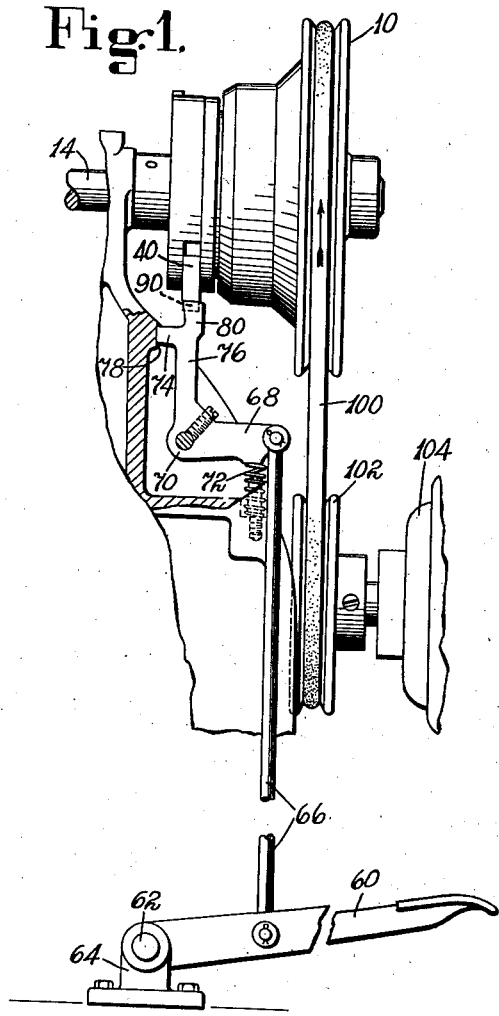
Fig. 1 is a side elevation showing the driving means for a machine and the tripping mechanism for starting and stopping the clutch of the present invention.

The driving member of the clutch consists of a grooved pulley 10, provided with a bushing 12 and loosely mounted upon the shaft 14 of the machine to be driven. Fitted to the inboard end of the pulley 10 is a hardened steel ring 16 which is of the usual type employed in roller clutches. When the clutch is engaged, three relatively small rollers 18 are arranged to engage the ring 16 frictionally. The movement of these rollers is controlled by a relatively movable roller cage 20 in substantially the usual manner, as will be described briefly hereinafter.

A regular prism 22, preferably hexagonal, and having a central bore larger than the driving shaft 14 of the machine, surrounds the shaft but is not in contact therewith, it being arranged to float in this substantially coaxial position by being held there by three intermediate members, these being, in the first embodiment of the invention, relatively large rollers 24, each of which is pressed against one of the alternate sides of the prism 22 by its cooperating roller 18, when the clutch is engaged. The rollers 24 are maintained in the above described positions by means of a cage 26 in compartments of which they fit freely radially (and with slight clearance circumferentially) and which cage will rotate with the shaft 14 because of the fact it is held by a series of screws 28 which are tapped into a collar-like member 30, fixed upon the shaft. These screws also secure a cover plate 31 which holds the parts of the clutch in position.

In order to keep the rollers 24 in position ready to be engaged wedgingly by the rollers 18 when the clutch is tripped, and to enable the rollers 24 to support the weight of the prism 22 in its floating position, each roller 24 is held frictionally in the desired position in the following manner. Each of these rollers is provided with a central bore and a coiled spring 32 is positioned in the bore. The spring is under slight compression, one end abutting on a portion of the cage 26 and the other end abutting on the cover plate 31. Each roller is a free fit on the compressed spring 32 and is also a free fit lengthwise between the cage 26 and cover plate 31, in addition to being a free fit in its slot, or compartment, 33 in the cage 26. The friction on the ends of the springs 32 is sufficient to hold them, the weight of their respective rollers 24, and the prism 22, in any position that they may assume, but such friction permits these parts to move easily to any position into which they may be forced by pressure placed on them in the operation of the clutch. This arrangement also prevents the parts from rattling, as they would if a substantial movement were necessary each time to bring them into operating position.

Figure 4:
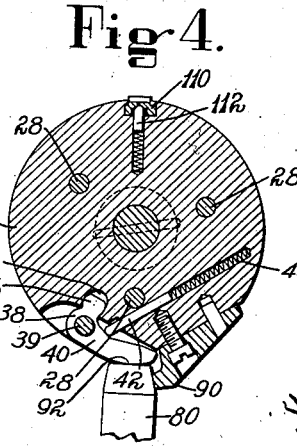
Fig. 4 is a section on the line IV—IV of Fig. 2, looking in the direction of the arrows.

The collar-like member 30 is provided with a substantially radial slot 34 into which fits the curved end of a short arm 36 of a spring-operated bell-crank lever 38 (see Fig. 4). The bell-crank lever 38 is mounted on a pivot pin 39 extending from the roller cage 20 and is provided with another and longer arm 40. Spring operation of the bell-crank is effected by a spring-pressed plunger 42 which engages the arm 40 of the bell-crank lever, the plunger being mounted in a bore in the member 30 and being forced outwardly by means of a coiled spring 44 mounted in the bore behind the plunger.

Figure 3:
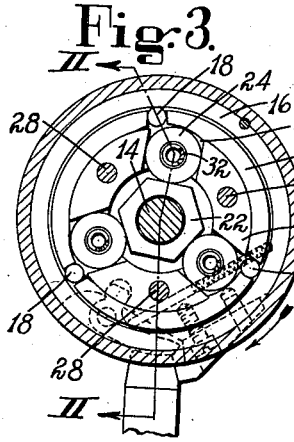
Fig. 3 is a section on the line III—III of Fig. 2 looking in the direction of the arrows.

When the bell-crank lever 38 is permitted to move under the influence of the spring 44, it swings in the slot 34 about the curved end of its short arm 36. This carries its pivot pin 39, and thereby the movable roller cage 20, in which the pin is secured, forwardly (clockwise in Fig. 3). This forward movement of the cage causes each small roller 18 wedgingly to engage its cooperating loosely and frictionally mounted roller 24 which is then forced forwardly against the side of its compartment in the cage 26 and radially inward against the prism 22, by continued forward movement of the cage 20.

Because the pressure of each roller 24 on the prism 22 is supported by the resultant pressure of the other two rollers 24, the pressure of all three rollers is equalized on the prism 22, maintaining it in its central floating position. Furthermore, all rollers of each set, small and large, take an equal share of the load and therefore all wear is equalized. If the rollers should be of unequal hardness, the pressure after unequal wear would still be equalized until the floating position of the prism 22 becomes so eccentric as to bring it in contact with the shaft 14.

When the clutch is tripped, the cage 20 moves into its forward position, thus carrying each roller 18 into frictional engagement with its cooperating roller 24, so that the clutch ring 16 in the rotating driving pulley 10 then rotates all of the rollers. The large rollers 24, in rotating, drive the prism 22 relatively forward until they contact positions on the prism of such increased diameter that further movement of this kind cannot take place, the parts being then locked in driving position. The rollers 24 then bodily drive their cage 26 forwardly as they are in contact with the sides of their compartments 33. The load of the cage 26 tends to maintain the rollers in their wedged position to carry whatever load is on the cage. The cage, through the screws 28 and the collar-like member 30 then drives the shaft 14 and its machine forwardly, this continuing as long as the cage 20 is held in forward position under the influence of the spring 44; in other words, as long as the clutch is engaged.

It will be seen that, by this arrangement, each large roller 24 has only a slight tendency to indent the prism 22 and that each small roller 18, while it may have some tendency to indent the ring 16, also has a most desirable wedging power and there is no tendency for localized wear because the circumference of this ring is comparatively long and contact is made at any given spot only infrequently. Thus, the wear that may eventually produce indentations in this preferred construction occurs on the flats of the prism 22. When such wear interferes with the action of the clutch, the prism may be shifted on the shaft, end for end, thereby providing a new surface, on the opposite side of the shortest diameter of the prism, for the rollers 24 to engage. Furthermore, when this second position also becomes worn, the prism may be shifted 60° angularly about the shaft to bring the alternate unused sides into a third operative position and thereafter it may again be shifted, end for end, in that angular position, to a fourth operative position. Thus, with the preferred use of a hexagonal prism, as illustrated, the clutch may be assembled in four different ways, each of which assemblage will wear longer than the usual type of roller clutch because of the reduced tendency to indent the wearing surfaces as already explained. Therefore, with this arrangement, it is possible to secure exceedingly long use of the clutch before even the prism 22 needs to be replaced, and even then it is unlikely that either the small rollers 18 or the large ones 24 will need to be replaced.

The clutch may be engaged or disengaged in the usual manner by means of a treadle 60 and its cooperating mechanism, illustrated in Fig. 1. The treadle is pivotally mounted at 62 in a bracket 64 secured to the floor. The treadle is connected to a treadle rod 66, the upper end of which is pivotally connected to the horizontal arm 68 of a bell-crank lever 70. The lever 70 is normally forced in a counterclockwise direction, and the treadle is thereby lifted, by means of a compression spring 72, mounted on the frame of the machine. This movement is limited by an abutment 74 on an upstanding arm 76 of the lever, the abutment 74 striking a cooperating abutment 78 on the frame of the machine.

Above the abutment 74, on the arm 76, of the bell-crank lever 70 is an upward extension 80 which stops the machine at the time that the abutments 74 and 78 are in contact with each other, or when the treadle is released, as will be explained. When the treadle is depressed, the extension 80 is freed from the arm 40 of the bell-crank lever 38 and is also freed at the same time from an abutment 90, secured to the member 30. The machine is then started because the spring 44 then rotates the bell-crank 38 in a clockwise direction (the slot 34 acting as a pivot), moving the small rollers 18 into wedging engagement with the ring 16 and the large rollers 24 into engagement with the prism to engage the clutch, as heretofore described, to drive the machine.

To stop the machine, the treadle 60 is raised, permitting the bell-crank lever 70 to rotate in a counterclockwise direction (Fig. 1) and bring its upward extension 80 into the path of movement of the long arm 40 of the bell-crank 38 so that the movable roller cage is moved relatively backward, by a prying action, to disengage the rollers. After the rollers have been disengaged, the arm 40 moves no further because of its arcuate face 92. The machine shaft is finally stopped by the abutment 90 striking the extension 80.

The pulley 10 is shown in Fig. 1 as being driven by a belt 100 connected to a pulley 102 secured to the shaft of an electric motor 104 but, of course, any other suitable driving means may be provided.

Figure 2:
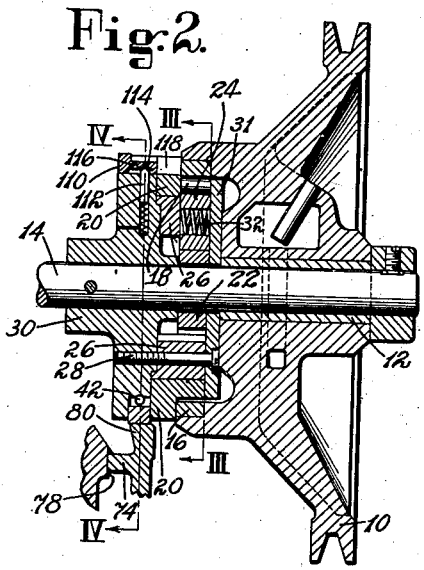
Fig. 2 is a vertical section of the clutch construction of one embodiment of the present invention on the line II—II of Fig. 3.

A safety device is provided to lock the roller cage 20 in disengaged position, so that the machine cannot be started, and cause damage, while adjustments are being made. This device (see Figs. 2 and 4) consists of a sliding member 110 located in a T-slot in the member 30 and held in either operative or inoperative position by a spring-pressed plunger 112 which may enter either the depression 114 or the depression 116 in the slide. The slide 110 is normally in the position where it is held by the depression 114 but it may be moved to the right (Fig. 2) where its end will enter the slot 118 in the roller cage 20 so that the cage cannot be moved by the spring 44 to cause the engagement of the clutch, even if the treadle should be depressed accidentally.

In the first-mentioned embodiment of the invention just described, and illustrated in Figs. 1 to 4, inclusive, the intermediate members take the form of rollers which are preferably larger than the rollers that contact with the driving member.

Figure 5:
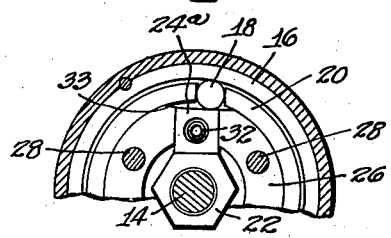
Fig. 5 is a vertical section, similar to Fig. 3, showing the second embodiment of the invention.

In the second embodiment of the invention, illustrated in Fig. 5, the intermediate members have the form of blocks which are rectangular. One of three blocks of this embodiment is indicated at 24a and these blocks operate in substantially the same manner as do the rollers 24, except, of course, they do not rotate. The remaining parts of the clutch, some of which are shown in this figure, operate in the same manner as in the first-described embodiment.

In the foregoing, the term "prism" has been applied for convenience to the floating member 22 and it has been illustrated as such in the drawing. In its place, however, any member with which the intermediate members may contact along lines spaced substantially 120° apart may be substituted and the claims, unless otherwise limited, should be construed to cover such a member.

Having thus described my invention, what I claim as new and desire to secure by Letters Patent of the United States is:

1. A roller clutch having, in combination, a shaft, a driving member, a driven member, a floating member in spaced relation to and substantially coaxial with the shaft, peripheral roller-engaging faces spaced 120° apart on said floating member, three groups of rollers between the driving member and the roller engaging faces of the floating member, and means for locking the rollers in each group to the driving member and to the floating member whereby the locked rollers will collectively drive said driven member.

2. A roller clutch having, in combination, a shaft, a driving member, a driven member, a hexagonal prism floating in spaced relation to and substantially coaxial with the shaft, three groups of rollers between the driving member and prism, means for locking the rollers in each group to the driving member and to the prism whereby the locked rollers will drive said driven member and means for unlocking the rollers.

3. A roller clutch having, in combination, a shaft, a driving member, a hexagonal prism floating in spaced relation to, and substantially coaxial with the shaft, three large rollers, a roller cage having three compartments in each of which a roller is freely positioned opposite alternate sides of the prism, and three small rollers, each arranged to contact with the driving member and with one of the large rollers to wedge and lock all of the rollers with equalized pressure to the driving member and to the prism, whereby the large rollers will drive the roller cage and thereby the shaft.

4. A roller clutch having, in combination, a shaft, a driving member, a driven member, a floating member in spaced relation to and substantially coaxial with the shaft, peripheral roller-engaging faces spaced 120° apart on said floating member, three rollers in contact with the roller engaging faces of the floating member, a bore through each roller, a coiled spring freely fitting in each said bore when the spring is under compression, abutments against which the ends of the compressed spring bear frictionally to maintain each roller in a position whereby the three rollers will support the floating member in said floating position, means for locking the rollers to the driving member and to the floating member, and means to cause the locked rollers to drive the driven member.

5. A roller clutch having, in combination, a shaft, a driving member, a floating member in spaced relation to, and substantially coaxial with the shaft, peripheral roller-engaging faces spaced 120° apart on said floating member, three large rollers, a roller cage having three compartments in each of which a roller is freely positioned opposite the roller engaging faces of the floating member, three small rollers, each arranged to contact with the driving member and with one of the large rollers to wedge and lock all of the rollers with equalized pressure to the driving member and to the floating member whereby the large rollers will drive said roller cage, a relatively movable roller cage for holding the small rollers and for moving them into and out of said contact, and means for controlling the movement of said movable roller cage.

6. A roller clutch having, in combination, a shaft, a driving member, a hexagonal prism floating in spaced relation to, and substantially coaxial with the shaft, three rollers, a roller cage having three compartments in each of which a roller is freely positioned opposite alternate sides of the prism, the prism, rollers and roller cage being constructed and arranged to be assembled relatively to each other in any one of a plurality of similar or equivalent operating positions, and means for locking the rollers with equalized pressure to the driving member and to the prism, whereby the rollers will drive the roller cage and thereby the shaft.

7. A roller clutch having, in combination, a shaft, a driving member, a floating member in spaced relation to and substantially coaxial with the shaft, a cage connected with the shaft and having three compartments equally spaced circumferentially, three blocks one of which is freely positioned in each of said compartments, a bore through each block parallel to the axis of the shaft, a coiled spring freely fitting in each said bore when the spring is under compression, abutments against which the ends of the compressed spring bear frictionally to maintain each block in a position where the three blocks will support the floating member in said floating position and means for locking the blocks at the will of the operator to the driving member and to the floating member, whereby the locked blocks will drive the cage and thereby the shaft.

8. In a roller clutch, intermediate members, a bore through each said member, a coiled spring freely fitting in each said bore when the spring is under compression, abutments against which the ends of each compressed spring bear frictionally to maintain each of said members in substantially operative position, while permitting movement of each said member in the usual operation of the clutch, and a floating member positioned by said frictionally held members.

VERNON H. MEYER.